W. SCHULDT.
DRAG TRUCK.
APPLICATION FILED AUG. 19, 1918.

1,333,780.

Patented Mar. 16, 1920.
2 SHEETS—SHEET 1.

INVENTOR
W. SCHULDT
BY
Milton S. Crandall
ATTORNEY

W. SCHULDT.
DRAG TRUCK.
APPLICATION FILED AUG. 19, 1918.

1,333,780.

Patented Mar. 16, 1920.
2 SHEETS—SHEET 2.

INVENTOR
W. SCHULDT
BY
Milton B. Crandall
ATTORNEY

UNITED STATES PATENT OFFICE.

WILL SCHULDT, OF MOVILLE, IOWA.

DRAG-TRUCK.

1,333,780.   Specification of Letters Patent.   Patented Mar. 16, 1920.

Application filed August 19, 1918. Serial No. 250,603.

*To all whom it may concern:*

Be it known that I, WILL SCHULDT, a citizen of the United States, and a resident of Moville, in the county of Woodbury and State of Iowa, have invented certain new and useful Improvements in Drag-Trucks, of which the following is a specification.

The invention aims to provide an improved truck adapted to carry a harrow or drag.

Another object of the invention is the production of a truck adapted to carry a drag and embodying improved means for raising and lowering the drag from and to operative positions.

Another object of the invention is the production of a truck adapted to carry a drag and a driver and embodying certain novel features and characteristics whereby the drag may be readily raised upon and lowered from the truck and whereby the truck is drawn in the rear of the drag when the latter is in use.

Furthermore, the invention contemplates a truck embodying certain features of construction and appurtenances whereby the truck may be drawn in the rear of a drag when the latter is in use and so constructed that the drag when not in use may be readily elevated on the truck, the truck being adapted to be drawn laterally to the direction it is drawn following the drag, whereby the drag may be conveniently transported from place to place, through gates and passage ways which will not accommodate the drag when drawn forwardly.

Still a further object of the invention is the production of a drag truck comparatively inexpensive and simple in construction yet durable and thoroughly efficient.

With these and other objects in view, the invention, consisting in the construction, combination and novel arrangement of parts, will be fully understood from the following description, reference being had to the accompanying drawings which form a part of the application and in which like characters of reference indicate corresponding parts throughout the several views, of which,—

Although I have illustrated and hereinafter described an embodiment suitable for practising the invention I would not be understood as being limited to the specific structure disclosed, for various alterations may be made in the details of construction and arrangement of parts without departing from the spirit and scope of the invention as defined in the appended claims.

Referring now to the illustrations, the harrow or drag presented consists of a gang of harrows, 4, arranged side by side in pairs, the pairs being connected with draw-bars, 5, connected to a main draw-bar, 6, to the end portions of which are pivoted links, 7, to the free ends of which may be secured a whiffletree, or other suitable draft-rigging, 8, to which animals may be hitched. The above structure represents no part of the invention but defines a familiar type of harrow or drag with which my invention is or may be advantageously associated.

The truck consists of a main-frame, 9, preferably triangular in general contour and mounted on caster wheels, 10, positioned at the corners of the frame. Two parallel booms, 11, are provided, pivoted on suitable bearings, 12, on the forward portion of the main-frame, to swing in vertical planes forwardly and rearwardly. The free ends of the booms are extended downwardly as at, 13, and adapted to be bolted or otherwise secured to the draw-bar means of the harrow. At the rear of the bearings, 12, are mounted upwardly and rearwardly-inclined uprights, 14, interconnected at their upper ends by a cross member, 15, and held rigidly with respect to the main-frame by suitable rear braces, 16. To the booms, 11, are secured cables, 17, or other flexible elements which pass over direction pulleys, 18, mounted in suitable bearings, 19, on the upper portions of the uprights, 14; over direction pulleys, 20, on the main-frame and then wound upon a drum, 21, carried by an upright shaft, 22, journaled at its lower end in the main-frame and at its upper end in a tripod, 23, mounted on the main-frame. The shaft, 22, is provided at its upper end with a crank wheel, 24; and a ratchet wheel, 25, engaged by a dog, 26, on the top of the tripod.

On the rear leg of the tripod, 23, is mounted the driver's seat, 27. When the drag is in operation the driver may ride the truck which is drawn in the rear of the drag and does not interfere with vertical movement of the drag as it travels over uneven ground.

Figure 2:
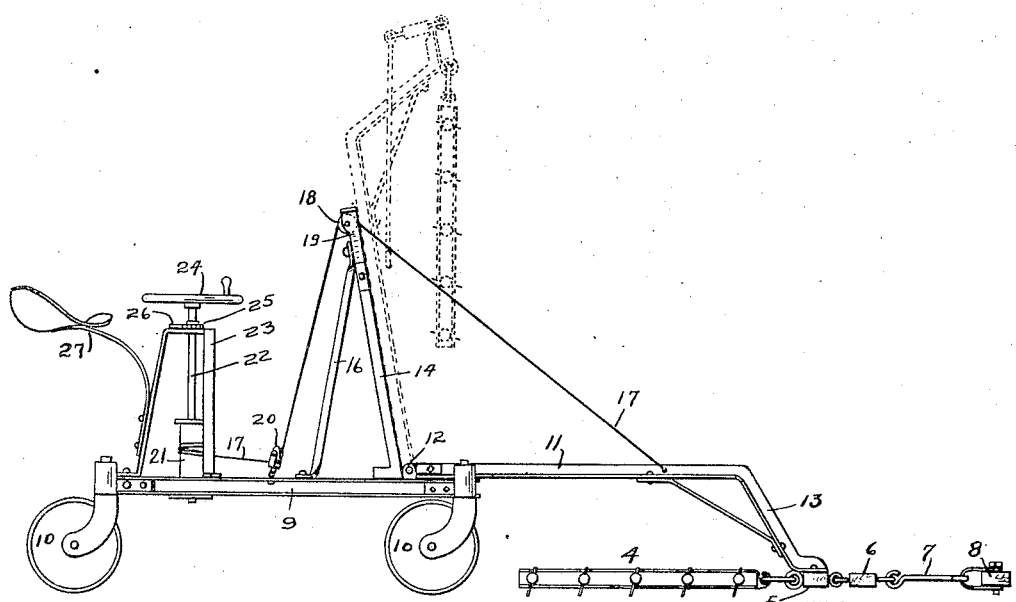
Fig. 2 is a side elevation of the same.

When it is desired to raise the drag, this is done by rotation of the shaft, 22, which coacts with the elements, 17, to draw the booms, upwardly and rearwardly to the position shown in dotted lines, in Fig. 2, whereby the drag is elevated and suspended from the draw-bar means. At one side of the main-frame I provide draft-rigging, preferably consisting of rods, 28, pivoted to the respective ends of one of the side members of the frame, the free ends of the rods being interconnected by a chain, 29, or other flexible link. When not in use the said links are swung adjacent the associated frame member and supported by a hook, 30, thereon.

Figure 1:
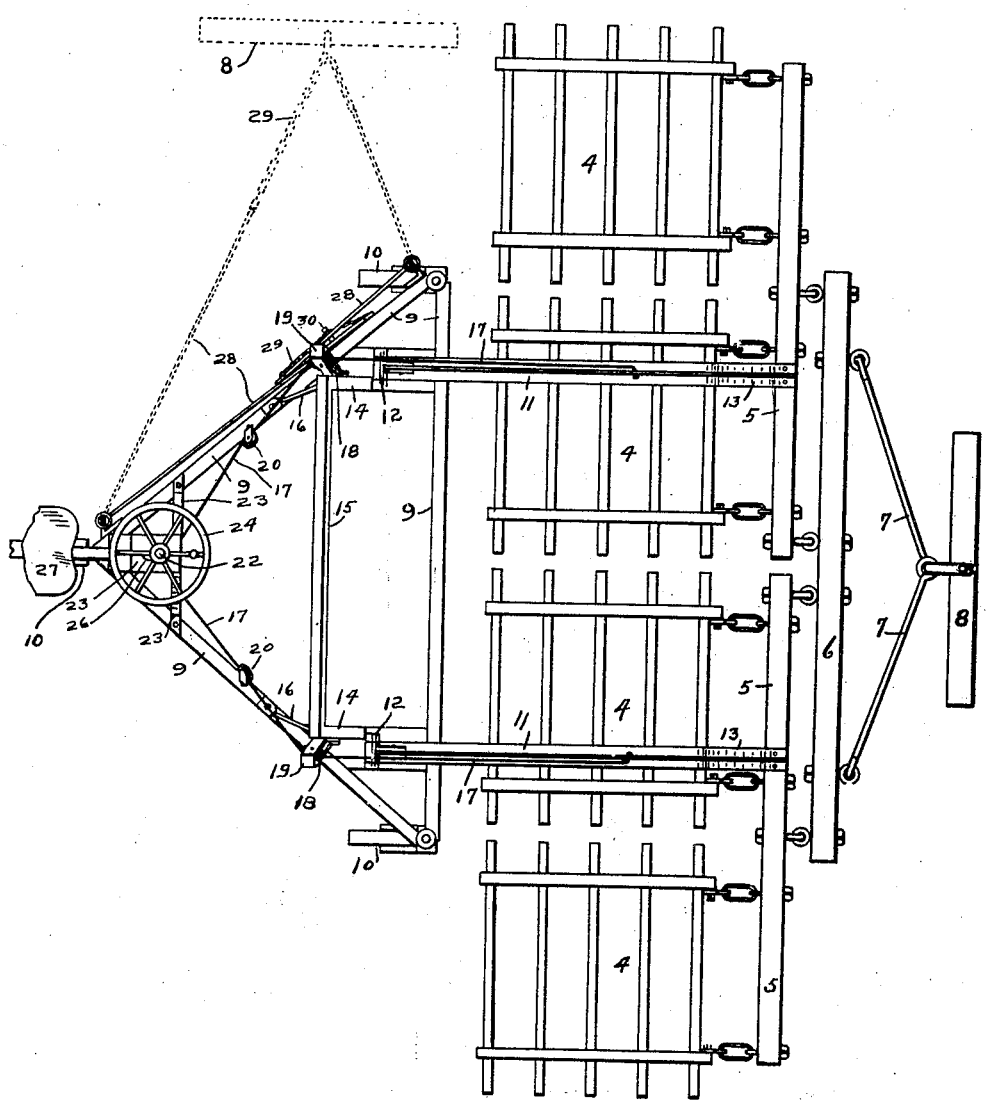
Figure 1 is a plan of a truck constructed in accordance with the invention and applied to a gang harrow.
Figure 3:
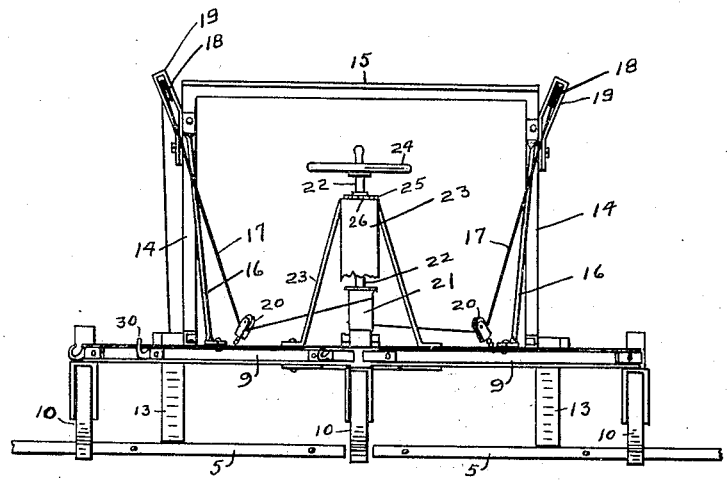
Fig. 3 is a rear elevation of the same.

The drag having been elevated, the whiffletree, 8, may be detached from the links, 7, and the lateral draft-rigging placed in operative position, (as shown in dotted lines in Fig. 1,) and the whiffletree then secured to the flexible link, 29, at a point where the draft on the associated rods is substantially uniform, whereby the truck may be drawn laterally. The bearings 19, on the upright, 14, afford stops positioned in the rear of the vertical planes of the bearings of the booms, to engage and prevent rearward movement of the booms beyond the stops.

Having thus described my invention, what I claim as new and desire to secure by Letters Patent of the United States, is,—

1. In a drag-truck, a wheeled frame, uprights thereon, booms pivoted on the frame to swing forwardly and rearwardly, and adapted to be secured at their free ends to the draft means of a drag, whereby the truck is drawn in the rear of the drag, and means coacting with the uprights and booms for swinging the booms rearwardly to elevate and hold the drag suspended.

2. In a drag-truck, a wheeled frame, uprights mounted thereon, booms pivoted on the frame to swing forwardly and rearwardly and adapted to be secured to the draft means of a drag, whereby the truck will be drawn in the rear of the drag, a rotatable drum on the frame, direction pulleys on the uprights, and flexible elements secured to the booms, passed over the pulleys and wound on the drum, whereby the drum coacts with said elements and booms to elevate the drag.

3. In a drag-truck, a wheeled frame, uprights mounted thereupon, booms pivoted on the frame to swing forwardly and rearwardly and adapted to be secured to the draft means of a drag, whereby the truck will be drawn in the rear of the drag, means on the frame for swinging the booms upwardly and rearwardly to elevate and support the drag, and stops on the uprights positioned in the rear of the vertical planes of the boom pivots, to engage and prevent rearward gravitation of the booms.

In testimony, whereof I have hereunto set my hand this 26th day of February, 1918.

WILL SCHULDT.